United States Patent [19]

Rabin

[11] 4,140,305

[45] Feb. 20, 1979

[54] UNIVERSAL PLANETARY CLAMPING DEVICE

[75] Inventor: Yehuda Rabin, South Caulfield, Australia

[73] Assignee: Dart Industries Inc., Los Angeles, Calif.

[21] Appl. No.: 833,948

[22] Filed: Sep. 16, 1977

[51] Int. Cl.² ............................................. B23D 7/08
[52] U.S. Cl. .................................. 269/47; 269/321 A
[58] Field of Search ............ 269/47, 309, 63, 311–314, 269/321 A; 33/185, 181 R; 279/1 L

[56] References Cited

U.S. PATENT DOCUMENTS

| 2,406,043 | 8/1946 | Sorensen | 269/63 X |
| 4,073,215 | 2/1978 | Coope et al. | 269/321 A X |

Primary Examiner—Robert C. Watson

[57] ABSTRACT

A rigid plate having a work piece supporting surface is securable to a machine tool. A plurality of spindles, each rotatable about an axis perpendicular to the support surface, are journalled within the plate. Engagement means carried by each spindle detachably receive attachment means for affixing a work piece to the supporting surface. The location of each engagement means is moveable relative the supporting surface in response to rotation of the respective spindle.

18 Claims, 6 Drawing Figures

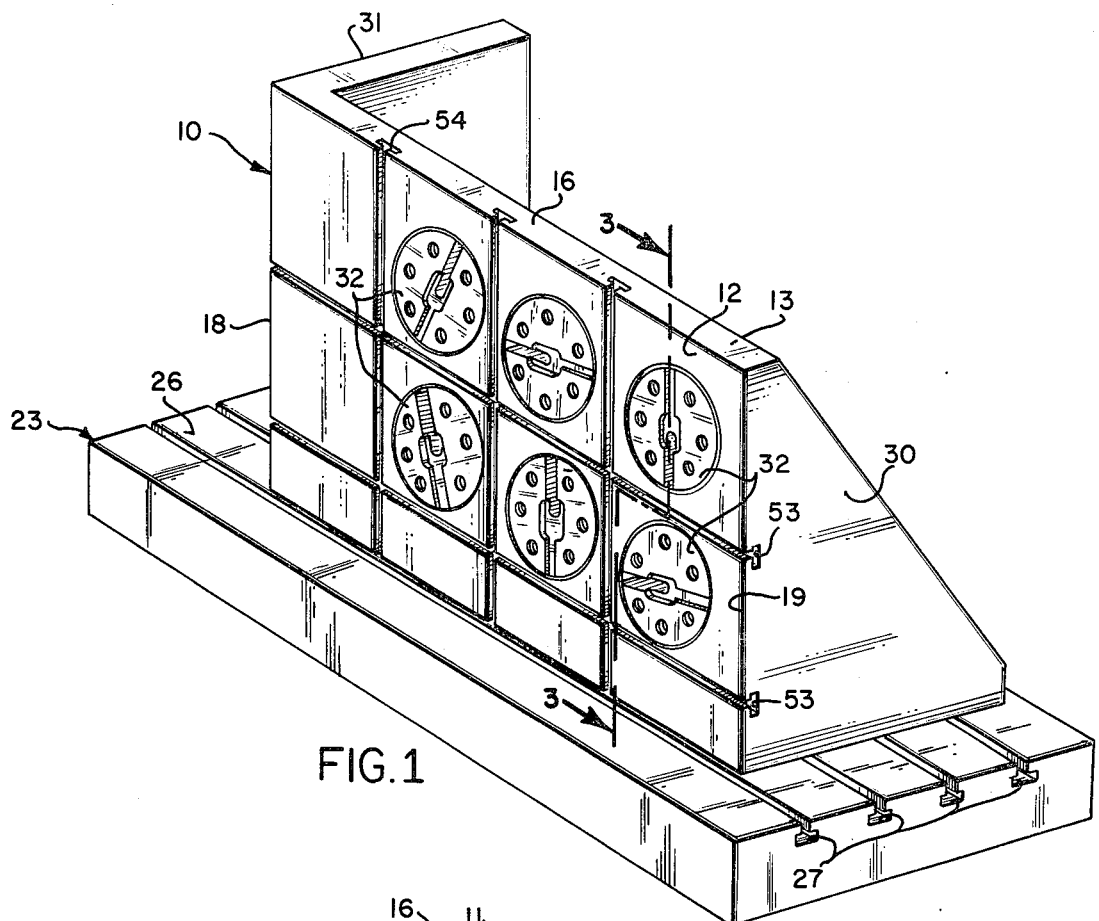
FIG.1
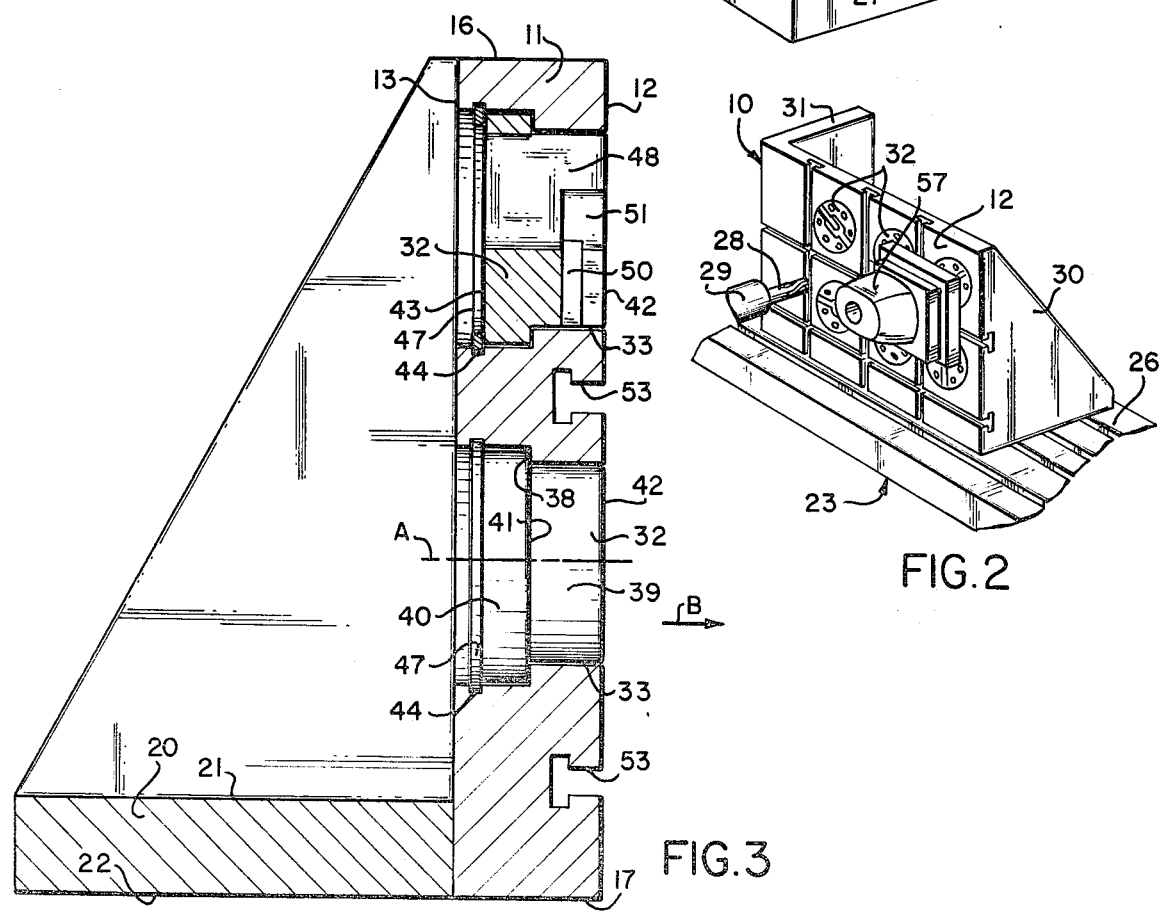
FIG.2
FIG.3

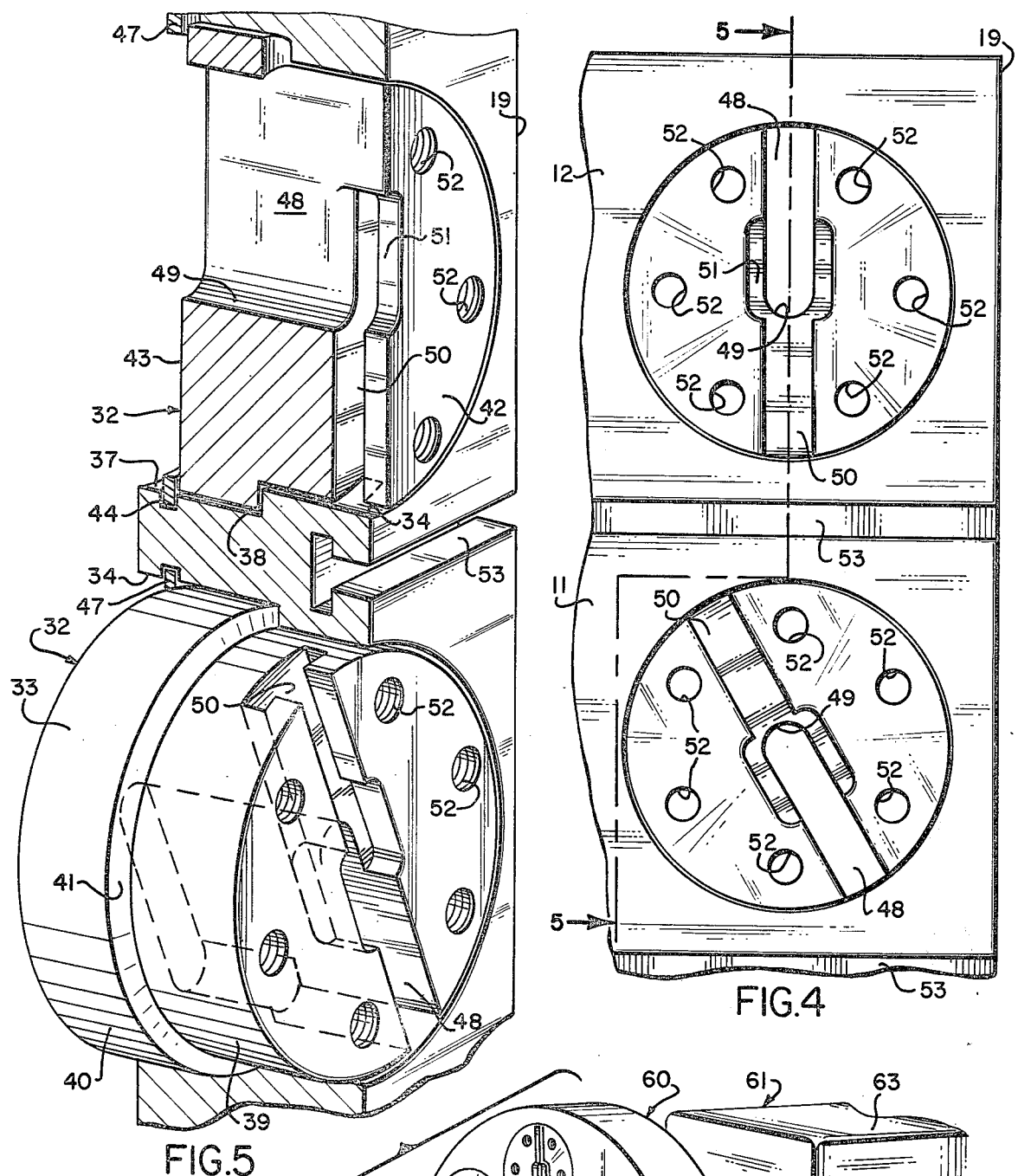
FIG.5
FIG.4
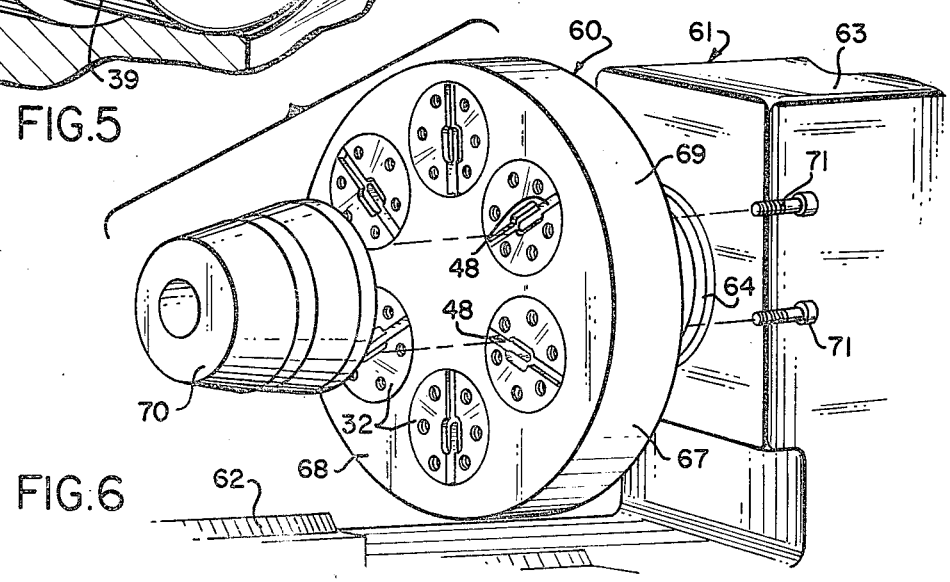
FIG.6

UNIVERSAL PLANETARY CLAMPING DEVICE

This invention relates to machine tools.

More particularly, the instant invention concerns accessories and attachments for machine tools.

In a further aspect, the present invention concerns a fixture for holding a work piece during machining operations.

Various methods are well known for fabricating an article from raw material. Broadly, commercial and industrial fabricating processes can be classified under the headings of machining, forming and assembling. Of immediate concern, is the procedure of machining.

In general, machining can be defined as the act of or the processes involved in shaping a solid piece of raw material into a finished product, usually in accordance with a predetermined plan as may be given by a blueprint. The material being worked upon is usually referred to as the work piece. During machining, various cutting operations are performed upon the work piece by a machine tool. Common machining operations include drilling, turning, boring, grinding, shaping, planing and other well known material removing procedures. The actual removal of material is done by a cutting tool which is held and driven by a machine tool, such as a drill press, lathe, vertical and horizontal milling machines, surface grinder, internal and external grinders, shaper and planer. Other machine tools and cutting processes will readily occur to those skilled in the art.

The prior art is replete with clamping and holding devices for supporting a work piece during machining. Face plates, chucks and cullets are used to hold the work piece for lathes and other machine tools in which the work piece is rotated against a stationary cutting tool. Angle plates, vises and various hold-down and clamping arrangements are commonly used to secure work in machine tools of the type having a rotating cutter. Milling machines and similar machining tools have integral work supporting tables, while in machines of the type represented by lathes, the work supporting device is attached to a spindle.

Each type of work supporting fixture has unique, inherent characteristics which are especially suited for particular machining operations. Vises and chucks grip a portion of the work piece which is then unavailable for machining. Face plates and angle plates can be made to support work in such a manner that substantial portions of the work piece are exposed. Numerous means are commonly employed within the art for securing the work piece to a plate-type holding fixture. For example, clamps may embrace the work piece and in turn be secured to the plate by bolts received directly in tapped holes within the plate, or engaged with T-nuts carried in especially machined slots which extend along the surface of the plate.

Another arrangement includes the use of C-clamps or parallel clamps straddling both the work piece and the plate for abutting the work piece against the surface of the plate.

For production machining it is common practice to provide a face plate having a plurality of apertures, either slots or cylindrical bores, extending therethrough. The work piece, usually a rough cast or molded item, is preliminarily prepared by machining a flat surface which then becomes the base or reference surface. Threaded holes, normally made by drilling and tapping, are formed into the work piece from the machined surface. To provide adequate support, two or more threaded holes may be created. The machined surface of the work piece is then placed against the work supporting surface of the plate. Subsequently, bolts are passed through the apertures in the plate and threadedly engaged within the preformed holes in the work piece. Locating fixtures of various types are commonly used to maintain relative positioning between subsequent work pieces to enable machining operations to be accomplished without resetting the machine.

The latter method of attaching a work piece to a face plate has obvious advantages over clamping type methods. A substantially greater portion of the work piece is available for machining. However, it is physically impossible to provide a plate having an infinite array of apertures. Therefore, the holes drilled and tapped into the work piece must be accurately located to align with pre-existing apertures within the plate or apertures especially created for the immediate purpose. When considering a large production run, the accurate location of several threaded holes within the work piece is a slow laborious task presenting undue financial burden upon the manufacturer. This is especially true when considered that the threaded hole function only as an intermediate expediency and are of no final value. The foregoing burden is also applicable to the machinist, who is concerned with only a single work piece.

It would be highly advantageous therefore to provide improved work holding means.

Accordingly, it is an object of the instant invention to provide a fixture for holding a work piece.

Another object of the invention is the provision of a fixture adapted for use with a machine tool to support a work piece during machining operations.

And, another object of the current invention is to provide a fixture of the plate type having various optional means for securing a work piece thereto.

Still another object of the invention is the provision of a work piece holding fixture which is usable with a variety of machine tools.

Yet another object of the present invention is to provide a holding fixture which is operatively usable with a work piece having preformed securment means.

A further object of the invention is the provision of a fixture which is self-aligning to compensate for inaccuracies of the securment means of the work piece.

Still a further object of this invention is to provide a work piece holding device which is usable in prototype and production machining situations.

And yet a further object of the invention is the provision of a fixture of the above type which is readily usable and durably constructed.

Briefly, to achieve the desired objectives of the present invention in accordance with a preferred embodiment thereof, first provided is a substantially rigid plate having first and second spaced opposed surfaces. The first surface is considered the work bearing surface. Extending through the plate are a plurality of generally cylindrical bores each having a longitudinal axis substantially perpendicular to the work supporting face. A spindle is rotatably journalled within each bore for rotation about the longitudinal axis. Each spindle has a first end, which is positioned proximate the first surface of the plate. Retention means are provided for limiting the actual movement of the spindle in a direction toward the first surface of the plate. Engagement receiving means are carried by each spindle for receiving means for securing the work piece against the work bearing surface of the plate.

Preferred engagement means carried by each spindle is in the form of a radial slot extending axially through the spindle. A bolt is receivable through the slot for engagement with a threaded hole preformed in the work piece and for securing the work piece to the work supporting surface of the plate. The relative position of the slot, with reference to the surface of the plate, is moveable in response to rotation of the spindle. The spindle may also carry other engagement receiving means such as a T-slot extending diametrically across the end of the spindle. Preferably, the end of the spindle is recessed from the work supporting surface of the plate to insure that the work piece abuts the work supporting surface.

Alternate embodiments of the plate are adapted for use with various machine tools. In accordance with the foregoing embodiment, the plate is placed horizontally upon the normal work supporting surface or table of a machine tool. In an alternate embodiment, a second plate resting upon the normal work supporting surface of the machine tool holds the work supporting surface in vertical alignment.

In yet another embodiment, means are provided on the second surface of the plate for detachable securement to spindle type machines.

The foregoing and further and more specific objects and advantages of the present invention will become readily apparent to those skilled in the art from the following detailed description of the invention and alternately preferred embodiments thereof taken in conjunction with the drawings in which:

FIG. 1 is a perspective view of a work piece holding fixture constructed in accordance with the teachings of the present invention as it would appear when placed upon the normal work supporting table of a machine tool, such as a milling machine;

FIG. 2 is a perspective view generally corresponding to the view of FIG. 1 and further illustrating the device of the present invention having a work piece supported thereby in position for machining;

FIG. 3 is an offset vertical sectional view taken along the line 3—3 of FIG. 1;

FIG. 4 is an enlarged fragmentary view of the work supporting surface of the device of FIG. 1;

FIG. 5 is an enlarged fragmentary perspective view of the fixture of FIG. 1 and shown partly in section as generated along the line 5—5 of FIG. 4; and FIG. 6 is an alternate embodiment of a work holding fixture constructed in accordance with the teachings of the present invention, and especially adapted for use with spindle type machines, specifically herein shown as a lathe.

Turning now to the drawings in which the same reference numerals represent corresponding elements throughout the several views, attention is first directed to FIG. 1 which shows a preferred embodiment of a fixture in accordance with the instant invention and generally designated by the reference character 10. Fixture 10, as is also seen in FIG. 3, includes a substantially rigid plate 11 having first and second spaced opposed surfaces 12 and 13. Plate 11 is generally rectangular having first and second longitudinal edges 16 and 17 respectively and first and second lateral edges 18 and 19 respectively. First surface 12 is considered the work supporting surface, as will be described presently.

Rigid base plate 20 having top surface 21 and bottom surface 22 is secured to second surface 13 of plate 11 such as by mechanical fasteners, welding or other expediencies well known in the metal working art. Bottom surface 22 of base plate 20 is perpendicular to first surface 12 of plate 11.

Table 23 is representative of the typical work supporting table common to various machine tools, such as milling machines for example. Table 23 includes work supporting surface 26 having a plurality of parallel longitudinally extending T-slots 27. The use of T-slots 27 in conjunction with various clamping devices for affixing a work piece directly to work supporting surface 26, or alternately for securing an auxilliary work holding device, such as a vise or conventional angle plate, to surface 26 will be readily understood by those skilled in the art.

Surface 26 is a precision surface which is flat and generally either perpendicular or parallel to a cutting tool 28 rotated and held by spindle 29 of the machine tool as seen in FIG. 2. Bottom surface 22 rests upon work supporting surface 26 and holds first surface 12 of plate 11 in perpendicular alignment with surface 26. Rigidity is provided by gusset 30 affixed to base 20 and plate 11 proximate second lateral edge 19. Further rigidity is provided by end plate 31 similarly affixed to base 20 and plate 11 proximate first lateral edge 18. In accordance with the immediate embodiment, end plate 31 has an outside surface (not herein specifically illustrated) which is perpendicular to first surface 12 and to bottom surface 22. End plate 31 can be employed, similar to base plate 20 to rest upon work supporting surface 26 and support first surface 12 in a substantially vertical position. Various means for rigidly attaching base plate 20 or end plate 31 to table 23 will readily occur to those skilled in the art. For this purpose and to accomodate bolts threadedly engageable with T-nuts carried within T-slots 27, base plate 20 and end plate 31 may have apertures, either in the form of cylindrical bores or slots, formed therethrough.

It will also be appreciated by those skilled in the art that, in accordance with an alternate embodiment of the instant invention, plate 11 is singularly useable without base 20, gusset 30 and end plate 31. In this configuration, plate 11 is placed horizontally and directly upon work supporting surface 26. If it is desired to elevate plate 11 from work supporting surface 26, various types of well known spacers, such as those commonly referred to as parallels, can be placed between work supporting surface 26 and second surface 13 of plate 11. Plate 11 can be secured to table 23 by clamps or other well known means usually employing the use of T-slots 27.

A plurality of spindles 32 are carried by plate 11. As clearly observed in FIG. 5, each spindle 32 has an outer cylindrical surface 33 which is rotatably journalled within a bore 34. Each bore 34 extends through plate 33 between first surface 12 and second surface 13 and is cylindrical about a longitudinal axis shown by the broken line A, which is perpendicular to face 12. Each spindle 32 is also rotatable about axis A.

Each bore 34 includes a counterbore 37 extending inwardly from second surface 13 and terminating with annular shoulder 38 extending radially between bore 34 and counterbore 37. Outer surface 33 of spindle 32 comprises a first cylindrical section 39 and an enlarged second cylindrical section 40 with annular shoulder 41 extending radially therebetween. First cylindrical section 39 and second cylindrical section 40 are rotatable within bore 34 and counterbore 37 respectively. The contact between annular shoulder 38 and annular shoulder 41 provides retention means for limiting and axial movement of spindle 32 in a direction towards first surface 12, as indicated by arrow B.

Each spindle 32 has a first end 42 and a second end 43 each of which are generally perpendicular to axis A and which are positioned proximate first surface 12 and second surface 13 respectively of plate 12. Preferably, end 42 is recessed slightly, 5/1,000 of an inch for example, from first surface 12, the purpose of which will be explained presently. An annular groove 44 is formed in plate 11 extending radially outward from counterbore 37. A lock ring 47, an annular member which is split radially, resides within groove 44. Lock ring 47 extends radially inward from counterbore 37 to receive second end 43 thereagainst and prevent the separation of spindle 32 from plate 11.

Referring now specifically to FIGS. 4 and 5, it is seen that each spindle 32 is provided with various engagement receiving means for receiving means for securing a work piece against surface 12 of plate 11. First engagement receiving means is in the form of a slot 48. Slot 48 extends through spindle 32, being open at first end 42 and second end 43. Slot 48 also extends in a radial direction terminating at shoulder 41 to be open with respect to first cylindrical section 39 and closed with respect to second cylindrical section 40. Preferably, the inner end 49 of slot 48 is semicylindrical about axis A. Accordingly, means for securing a work piece against first surface 12 can be received through slot 48 at the center of spindle 32. If the securing means is a bolt, for example, the longitudinal axis of the bolt can align with axis A. The relative position of the bolt with respect to work supporting surface 12 is readily alterable and determined by the axial placement of the bolt along slot 48 and the rotation of spindle 32. It will be appreciated therefore that the bolt is capable of assuming any position within bore 34.

Second engagement receiving means carried by spindle 32 is in the form of a T-slot 50. T-slot 50 extends diametrically across spindle 32 and is open at first end 42. Access to T-slot 50, for the insertion of a T-nut or T-headed bolt therein, is provided by an opening 51 having substantially the same width as the enlarged portion of the T-slot and positioned at approximate the axial center of spindle 32. It will be readily recognized by those skilled in the art that T-slot 50, similar to slot 48, is moveable to provide engagement receiving means over the entire area defined by bore 34 in accordance with rotation of spindle 32. A plurality of spaced threaded holes, such as formed by the operations of drilling and tapping, are also carried by spindle 32 and form third engagement receiving means. Each threaded hole 52 extends substantially perpendicularly inward from first end 42.

Fixture 10 further includes fourth engagement receiving means which are carried by a plate 11. Fourth engagement receiving means comprises longitudinal T-slots 53 and lateral T-slots 54. T-slots 53 and 54 are accessible from first surface 12 and are arranged to lie between spindles 32.

A typical work piece, such as work piece 57 shown in FIG. 2, can be readily attached to fixture 10 by various means consistent with the immediate desires of the machine tool operator. As previously stated, it is conventional practice to prepare the work piece by machining a base surface and forming two or more threaded holes. With conventional angle plates or work holding fixtures, it was required that the threaded holes be accurately placed to align with pre-existing bolt receiving holes within the angle plate. Alternately, the angle plate could be drilled to accommodate a given work piece and threaded hole placement. It was also necessary that several fixtures be available for use in accordance with the particular size and threaded hole placement of numerous and various work pieces, since it is obvious that a limited number of holes can be drilled through a given fixture.

With the fixture of the instant invention, accurate placement of the threaded holes in the base of the work piece is rendered unnecessary. The appropriate spindles are simply rotated until the slots 48 align with respective holes. This is particular important in the production run machining operations where locating means are used in combination with the holding fixture of the instant invention. The locating means places each successive work piece at approximately the same location on face 12. Rotation of the appropriate spindles readily compensates for inaccuracies in the placement of threaded holes of subsequent work pieces.

Other obvious advantages are also accrued from the work holding fixture of the instant invention. The use of various straps and clamps in combination with T-slots or threaded holes is conventional practice and well known to those skilled in the art. Heretofore, the placement of the clamps or straps upon the work piece has been restricted in accordance with the availability of T-slots or threaded apertures in a given work holding fixture. Frequently, it was necessary to clamp the work piece at available locations and machine that portion of the piece that was exposed for machining. Subsequently, the work piece was reoriented and reclamped to make the remaining portions of the work piece to the cutter of the machine tool. With the device of the instant invention, it is readily apparent that an infinite number of clamping positions are available between the combination of the T-slots 53 and 54 carried by plate 11, and the T-slots 50 and threaded holes 52 which are removeable in accordance with the rotating spindle 32.

As the bolt or other securing means is tightened, shoulder 38 is drawn firmly against shoulder 41 and the base of the work piece is drawn firmly against work holding surface 12. This is assured since first end 42 of each spindle 32 is recessed from surface 12. During the securement of the work piece to face 12, no stress is applied to locking ring 43.

FIG. 6 illustrates an alternate embodiment of a work holding fixture constructed in accordance with the teachings of the instant invention and generally designated by the reference character 60. Embodiment 60 is particularly adapted for use in combination with the type of machine tool which rotates the work piece such as typically illustrated by lathe 61. Briefly, lathe 61 includes bed 62 and head stock 63 which drivingly rotates spindle 64. Further description of lathe 61 will not be made, since such machine tools are well known to those skilled in the art.

Work holding fixture 60 includes a generally cylindrical rigid plate 67 having a work bearing first surface 68 and a spaced opposed second surface 69, the latter not being specifically visible. Plate 67 is generally analygous to plate 11 except for the parametric shape thereof. A plurality of spindles 32, as described in connection with the previous embodiment, are rotatably carried by plate 69. In the immediate embodiment, spindles 32 are placed annularly about work supporting face 68.

Although not specifically herein illustrated, but as will be readily understood by those skilled in the art, attachment means extend axially from second surface 69 for coupling fixture 69 with spindle 64. Manufacturers of lathes and other rotating type machine tools generally provide a variety of various work holding devices, such as face plates, chucks and collets, which are detachably secureable to the spindle of the machine in accordance with the immediate needs of the machine operator. The exact means of attaching the work holding device to the spindle is variable with the specific manufacturer, but generally includes some type of threaded connection or pin and cam lock arrangement. The attachment means, as an independent accessory item, is often supplied by the manufacturer for use by machine tool operators desirous of fabricating a specialized work holding fixture. Such an accessory is readily secureable to plate 67. Alternately, plate 67 can be secured directly to a face plate as supplied by the manufacturer.

As illustrated herein, work piece 70 is being attached to fixture 60 for turning, boring and facing operations as are usually performed on lathes. Work piece 70 has been prepared by machining the base surface, if necessary, and forming threaded holes therein as appropriate. Subsequently, the base surface of work piece 70 is placed against work holding surface 68 of plate 67. Finally, bolts 71 are received through slots 48 and secured with the threaded holes in work piece 70. A center or other locating device may be used for placement of work piece 70 and the appropriate spindles 32 rotated to bring the respective slots 48 into alignment with the threaded holes in the work piece.

Various changes and modifications to the embodiments herein chosen for purposes of illustration will readily occur to those skilled in the art. It is perceivable for example that the size, configuration, number and placement of spindles within a given plate is at the discretion of the manufacturer. The number and placement of engagement and receiving means associated with each spindle is similarly readily alterable. Also, alternate shapes of the plate and the engagement receiving means carried directly thereby are readily subject to modification. To the extent that such modifications do not depart from the spirit and scope of the invention, they are to be viewed in terms of the appended claims.

Having fully described and disclosed the present invention and alternately preferred embodiments thereof in such clear and concise terms as to enable those skilled in the art to understand and practice the same, the invention claimed is:

1. A fixture for use with a machine tool and for holding a work piece during machining operation by said machine tool, said fixture comprising:
   (a) a substantially rigid plate having first work supporting surface and a second spaced opposed surface
   (b) a generally cylindrical bore extending through said plate between said first work supporting surface and second surface thereof;
   (c) a spindle having first and second ends and an outer generally cylindrical surface and journaled within said bore for rotation about the longitudinal axis of said bore, the first end of said spindle being positioned proximate but slightly recessed from the first work supporting surface of said plate;
   (d) first retention means for limiting the axial movement of said spindle in a direction toward the first work supporting surface of said plate; and
   (e) engagement receiving means carried by said spindle for receiving means for securing said work piece against the first work supporting surface of said plate.

2. The fixture of claim 1, wherein said first retention means includes:
   (a) a first annular shoulder extending radially inward from said base; and
   (b) a second annular shoulder extending radially outward from said spindle and received against said first shoulder.

3. The fixture of claim 1, further including second retention means cooperating with said first retention means for retaining said spindle within said bore.

4. The fixture of claim 3, wherein said second retention means includes:
   (a) an annular groove extending radially outward from said bore into said plate; and
   (b) an annular ring member carried in said groove and extending radially inward to receive the second end of said spindle thereagainst.

5. The fixture of claim 1, wherein said engagement receiving means comprises a radial slot extending through said spindle between the first and second ends thereof.

6. The fixture of claim 5, wherein said slot extends radially from proximate the center of said spindle to proximate the outer surface of said spindle.

7. The fixture of claim 6, wherein said slot defines an opening along the outer surfaces of said spindle.

8. The fixture of claim 1, wherein said engagement receiving means includes a T-slot extending diametrically along the first end of said spindle.

9. The fixture of claim 1, wherein said engagement receiving means includes an internally threaded bore extending inwardly from the first end of said spindle and having a longitudinal axis substantially parallel to the longitudinal axis of said spindle.

10. The fixture of claim 9, further including a plurality of spaced, annularly arranged, internally threaded bores extending inwardly from the first end of said spindle, each said bore having a longitudinal axis substantially parallel to the longitudinal axis of said spindle.

11. The fixture of claim 1, wherein the first end of said spindle is recessed from the first surface of said plate.

12. The fixture of claim 1, further including engagement receiving means carried by said plate.

13. The fixture of claim 1, further including means for detachably securing said plate to said machine tool.

14. The fixture of claim 1, wherein said plate is generally rectangular, having first and second longitudinal edges and first and second lateral edges.

15. The fixture of claim 14, further including a first base plate carried by said rigid plate proximate a longitudinal edge thereof and having a bottom surface substantially perpendicular to the first surface of said rigid plate.

16. The fixture of claim 15, further including a second base plate carried by said rigid plate proximate a lateral edge thereof and having an outer surface substantially perpendicular to the first surface of said rigid plate.

17. The fixture of claim 1, wherein said rigid plate is generally cylindrical.

18. The fixture of claim 17, further including means carried by the second surface of said rigid plate for attaching said fixture to a machine tool.

* * * * *